3,787,424
DIALKYLAMINO ESTERS OF BENZOPYRANO-
PYRIDINES
Harry George Pars, Lexington, and Raj Kumar Razdan,
Belmont, Mass., assignors to Sharps Associates, Cambridge, Mass.
No Drawing. Filed May 8, 1972, Ser. No. 251,618
Int. Cl. C07d 31/34
U.S. Cl. 260—295 T                 6 Claims

ABSTRACT OF THE DISCLOSURE

Dialkylamino esters of benzopyranopyridines represented by the formula

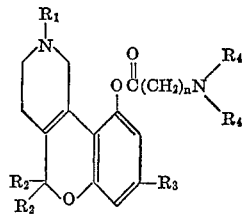

wherein $R_1$ is hydrogen, loweralkanoyl, cycloalkylloweralkyl, loweralkyl, cycloalkylloweralkanoyl, loweralkenyl, loweralkynyl, haloloweralkenyl, phenylloweralkyl, phenylloweralkenyl or phenylloweralkynyl; $R_2$ is loweralkyl; $R_3$ is $C_1$–$C_{20}$ alkyl or cycloalkylloweralkyl; $n$ is an integer from 1 to 6; and $R_4$ is hydrogen or loweralkyl; and the pharmaceutically acceptable acid addition salts thereof.

DETAILED DESCRIPTION OF THE INVENTION

This invention relates to dialkylamino esters of benzopyranopyridines, to compositions containing the compounds and to methods for preparing and using the compounds.

The compounds of this invention are represented by the formula

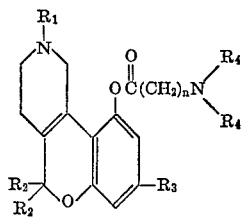

wherein $R_1$ is hydrogen, loweralkanoyl, cycloalkylloweralkyl, loweralkyl, cycloalkylloweralkanoyl, loweralkenyl, loweralkynyl, haloloweralkenyl, phenylloweralkyl, phenylloweralkenyl or phenylloweralkynyl; $R_2$ is loweralkyl; $R_3$ is $C_1$–$C_{20}$ alkyl or cycloalkylloweralkyl; $n$ is an integer from 1 to 6; and $R_4$ is hydrogen or loweralkyl; and the pharmaceutically acceptable acid addition salts thereof.

The term "loweralkyl," as used herein, refers to $C_1$–$C_6$ straight or branched chain alkyl groups including methyl, ethyl, n-propyl, iso-propyl, n-butyl, sec-butyl, tert-butyl, n-pentyl, iso-pentyl, neo-pentyl, n-hexyl and the like.

The term "loweralkenyl" refers to straight and branched chain $C_2$–$C_6$ alkyl radicals from which a hydrogen atom has been removed from each of two adjacent carbon atoms to produce ethylenic unsaturation; e.g., vinyl, allyl, methallyl, 1-pentenyl and the like.

The term "loweralkynyl" refers to $C_2$–$C_6$ alkyl groups as defined above, from which two hydrogen atoms have been removed from each of two adjacent carbon atoms to produce acetylenic unsaturation; e.g., ethynyl, propargyl, 2-butynyl, 1-pentynyl and the like.

The term "halo" includes chloro, fluoro, bromo and iodo.

The term "loweralkanoyl" refers to saturated, monovalent, aliphatic radicals derived from a monocarboxylic acid, including straight or branched chain radicals of from one to six carbon atoms including formyl, acetyl, propionyl, α-methylpropionyl, butyryl, hexanoyl and the like.

"Cycloalkyl," as used herein, refers to cyclic, saturated aliphatic radicals of from three to eight carbon atoms, such as cyclopropyl, cyclobutyl, cyclohexyl and cyclooctyl.

"Cycloalkylloweralkyl" refers to groups such as cyclopropylmethyl, 2-methylcyclobutyl and the like.

The term "$C_1$–$C_{20}$ alkyl" refers to straight and branched chain alkyl radicals having from one to twenty carbon atoms such as methyl, n-amyl, 3-methyl-2-octyl, 2-nonyl, 2-eicosanyl and the like.

The term "acid addition salts" refers to non-toxic salts prepared by reacting a basic ester of a benzopyranopyridine with an organic or inorganic acid, or by reacting a benzopyranopyridine with a salt of an appropriate acid. Representative salts include the hydrochloride, hydrobromide, sulfate, bisulfate, acetate, valerate, oleate, laurate, borate, benzoate, lactate, phosphate, tosylate, citrate, maleate, succinate, tartrate, napsylate and the like. Such salts are well known in the art and are considered to be "pharmaceutically acceptable."

As used herein, the terms "phenylloweralkyl," "phenylloweralkenyl," and phenylloweralkynyl" mean a monovalent radical consisting of a phenyl nucleus bonded to the rest of the molecule, respectively, through a divalent loweralkylene radical of from one to four carbon atoms as illustrated by, but not limited to methylene, 1,1-ethylene, 1,2-ethylene, 1,3-propylene, 1,2-pyropylene, 1,4-butylene and the like or through a divalent loweralkenylene radical of from two to four carbon atoms, as illustrated by, but not limited to 1,2-ethenylene, 1,3-(1-propenylene), 1,3-(1-butenylene), 1,4-(2-butenylene) and the like, or through a divalent loweralkynylene radical of from two to four carbon atoms, as illustrated by, but not limited to 1,2-ethynylene, 1,3-propynylene, 1,3-(1-butynylene) and the like. Here and elsewhere throughout this specification, it will be understood the benzene ring of phenyl can bear any number and kind of substituents such as would occur to the man skilled in organic chemistry. Solely for illustration, and without limitation, such substituents include loweralkyl, loweralkoxy, halo(chloro, bromo, iodo, or fluoro), nitro, loweralkylmercapto and the like.

The compounds of this invention are useful as antidepressant agents at dosages of 0.5 to 250 mg./kg. of body weight daily. The anti-depressant activity was first established using the modified dopa test (Fed. Proc. 23, p. 198 (1964). The compounds also exhibit tranquilizing overtones which makes them particularly useful in treating depression where agitation is one of the manifested symptoms.

Presently preferred compounds are those where $R_1$ is alkynyl.

Generally speaking, the esters of this invention are prepared by reacting equimolar quantities of the corresponding benzopyranopyridines, a carbodiimide such as dicyclohexylcarbodiimide, and the appropriate acid or its salt in a suitable solvent such as methylene chloride, chloroform and the like.

The reaction mixture is filtered to remove the byproduct of dicyclohexylurea, and the solvent can be distilled off using a rotary evaporator. The residue can be directly crystallized from suitable solvents such as benzene/ether or the residue can be chromatographed and the desired material isolated from the appropriate chromatographic fractions. If the acid rather than the acid salt is reacted with the benzopyranopyridine, the desired acid addition salt of the basic ester can be prepared by methods well known in the art.

The preferred reaction is represented by the following reaction sequence:

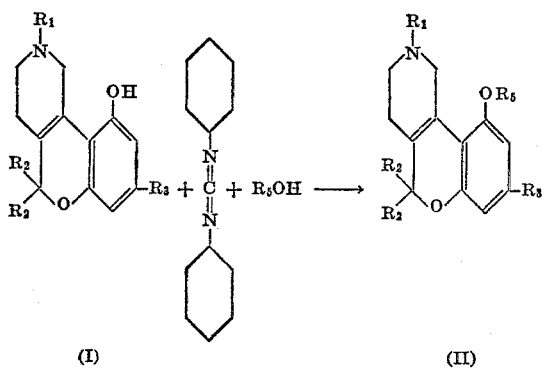

wherein $R_1$, $R_2$, $R_3$ and $R_4$ are as defined above and $R_5$ is

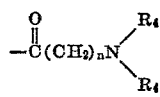

The preparation of the benzopyranopyridines of Formula I is disclosed in U.S. Pat. No. 3,576,798 and 3,429,889.

The following examples further illustrate the present invention:

EXAMPLE 1

5,5-dimethyl - 10 - [4-(diethylamino)butyryloxy] - 8 - (3-methyl - 2 - octyl)-2-(2 - propynyl)-1,2,3,4-tetrahydro-5H-[1]benzopyrano[3,4-d]pyridine hydrochloride 0.8 g. (2.0 mmole) of 5,5-dimethyl-10-hydroxy-8-(3-methyl - 2 - octyl)-2-(2-propynyl)-1,2,3,4-tetrahydro-5H-[1]benzopyrano[3,4-d]pyridine, 0.39 g. (2.0 mmoles) of γ-diethylaminobutyric acid hydrochloride (F. F. Blicke, W. B. Wright and M. F. Zienty, J. Am. Chem. Soc. 63, 2488 (1941) and 0.45 g. (2.2 mmoles) of dicyclohexylcarbodiimide (Aldrich) were combined with 45 ml. of methylene chloride and stirred at room temperature overnight. The by-product of dicyclohexylurea was separated by filtration and the methylene chloride was removed using a rotary evaporator. The residue was dissolved in a mixture of methylene chloride/cyclohexane and filtered to remove any insoluble material. The solvents were evaporated and the residue dried in vacuo to give 0.8 g. (70%) of the product as a yellow powder. The desired product showed an $R_f$ of 0.4 on TLC in 10% methanol/chloroform. The IR and NMR spectra are consistent with the proposed structure.

*Analysis*: $C_{34}H_{53}N_2O_3Cl \cdot H_2O$. Theory: C=69.10; H=9.37; N=4.74. Found: C=69.86; H=9.53; N=4.99.

EXAMPLE 2

5,5 - dimethyl-10-[4-(dimethylamino)butyryloxy]-8-(3-methyl-2-octyl) - 2 - (2-propynyl)-1,2,3,4-tetrahydro-5H-[1]benzopyrano[3,4-d]pyridine is prepared according to the method of Example 1 by reacting equimolar quantities of 5,5 - dimethyl-10-hydroxy-8-(3-methyl-2-octyl)-2-(2 - propynyl)-1,2,3,4-tetrahydro - 5H - [1]benzopyrano-[3,4-d]pyridine with γ-dimethylaminobutyric acid and dicyclohexylcarbodiimide.

EXAMPLE 3

10-[3-(dibutylamino)propionyloxy] - 5,5 - dimethyl-8-(3-methyl-2-octyl) - 2 - (2-propynyl)-1,2,3,4-tetrahydro-5H-[1]benzopyrano[3,4-d]pyridine hydrobromide is prepared according to the method of Example 1 by reacting equimolar quantities of 5,5-dimethyl - 10 - hydroxy-8-(3-methyl - 2-octyl)-2-(2-propynyl)-1,2,3,4-tetrahydro-5H-[1] benzopyrano[3,4 - d]pyridine with β - dibutylaminopropionic acid hydrobromide and dicyclohexylcarbodiimide.

EXAMPLE 4

5,5 - dimethyl-10-(dipropylaminoacetyloxy)-8-n-pentyl-2-(2-propynyl) - 1,2,3,4 - tetrahydro-5H-[1]benzopyrano-[3,4-d]pyridine tartrate is prepared according to the method of Example 1 by reacting equimolar quantities of 5,5-dimethyl - 10 - hydroxy-8-n-pentyl-2-(2-propynyl)-1,2,3,4-tetrahydro - 5H - [1]benzopyrano[3,4-d]pyridine, dipropylaminoacetic acid tartrate and dicyclohexylcarbodiimide.

EXAMPLE 5

5,5-dimethyl - 10 - [5-(dipentylamino)valeryloxy]-8-(2-nonyl)-2-(2 - propynyl)-1,2,3,4-tetrahydro-5H-[1]benzopyrano[3,4-d]pyridine hydrochloride is prepared according to the method of Example 1 from equimolar amounts of 5,5 - dimethyl-10-hydroxy-8-(2-nonyl)-2-(2-propynyl)-1,2,3,4-tetrahydro-5H-[1]benzopyrano[3,4-d]pyridine, δ-dipentylaminovaleric acid hydrochloride and dicyclohexylcarbodiimide.

EXAMPLE 6

10-[4 - (dihexylamino)butyryloxy] - 2 - (2-propynyl)-5,5,8-trimethyl - 1,2,3,4 - tetrahydro-5H-[1]benzopyrano-[3,4-d]pyridine is prepared according to the method of Example 1 from equimolar quantities of 10-hydroxy-2-(2-propynyl)-5,5,8-trimethyl - 1,2,3,4 - tetrahydro-5H-[1] benzopyrano[3,4-d]pyridine, γ-dihexylaminobutyric acid and dicyclohexylcarbodiimide.

EXAMPLE 7

2 - benzyl-10-[5-(diisopropyl)valeryloxy]-5,5-dimethyl-8-(2 - hexadecyl)-1,2,3,4-tetrahydro-5H-[1]benzopyrano-[3,4-d]pyridine is prepared according to the method of Example 1 from equimolar amounts of 2-benzyl-5,5-dimethyl-8-(2-hexadecyl)-10-hydroxy - 1,2,3,4 - tetrahydro-5H-[1]benzopyrano[3,4 - d]pyridine δ-diisopropylaminovaleric acid and dicyclohexylcarbodiimide.

EXAMPLE 8

By reacting 2-benzyl-5,5-dimethyl - 10 - hydroxy-8-(1-pentyl)-1,2,3,4-tetrahydro - 5H - [1]benzopyrano[3,4-d] pyridine with equimolar amounts of β-diisobutylaminopropionic acid hydrochloride and dicyclohexylcarbodiimide, according to the method of Example 1, there is obtained 2-benzyl-10-[3-(dissobutylamino)propionyloxy]-5,5-dimethyl-8-(1 - pentyl)-1,2,3,4-tetrahydro-5H-[1]benzopyrano[3,4-d]pyridine hydrochloride.

EXAMPLE 9

By reacting 2-cyclobutylmethyl - 5,5 - dimethyl-8-(2-eicosyl)-10-hydroxy - 1,2,3,4 - tetrahydro-5H-[1]benzopyrano[3,4-d]pyridine with equimolar amounts of γ-diethylaminobutyric acid hydrobromide and dicyclohexylcarbodiimide, according to the method of Example 1, there is obtained 2 - cyclobutylmethyl-10-[4-(diethylamino)butyryloxy]-8-(2-eicosyl)-1,2,3,4-tetrahydro - 5H - [1]benzopyrano[3,4-d]pyridine hydrobromide.

EXAMPLE 10

By reaction 5,5-dimethyl-10-hydroxy-2-phenethyl-8-(2-tetradecyl)-1,2,3,4-tetrahydro-5H-[1]benzopyrano - [3,4-d]pyridine with equimolar amounts of γ-diethylaminobutyric acid hydrochloride and dicyclohexylcarbodiimide, according to the method of Example 1, there is obtained 10-[4-(diethylamino)-butyryloxy]-5,5 - dimethyl-2-phenethyl-8-(2-tetradecyl) - 1,2,3,4 - tetrahydro-5H-[1]benzopyrano-[3,4-d]pyridine hydrochloride.

EXAMPLE 11

By reacting 2-allyl-5,5-diethyl-10-hydroxy-8-(3-methyl-2-octyl)-1,2,3,4 - tetrahydro - 5H[1]benzopyrano-[3,4-d] pyridine with equimolar amounts of γ-diethylaminobutyric acid acetate and dicyclohexylcarbodiimide, according to the method of Example 1, there is obtained 2-allyl-5,5-diethyl - 10 - [4 - (diethylamino)butyryloxy]-

1,2,3,4-tetrahydro - 5H - [1]benzopyrano[3,4-d]pyridine acetate.

EXAMPLE 12

By reacting 2-acetyl-8-(3-cyclopropyl-2-propyl)-5,5-dimethyl-10-hydroxy-1,2,3,4 - tetrahydro - 5H - [1]benzopyrano[3,4-d]pyridine with equimolar amounts of dipropylaminobutyric acid and dicyclohexylcarbodiimide, according to the method of Example 1, there is obtained 2-acetyl-8-(3-cyclopropyl-2-propyl)-5,5 - dimethyl-10-[4-(dipropylamino)butyryloxy] - 1,2,3,4 - tetrahydro-5H-[1]benzopyrano[3,4-d]pyridine.

EXAMPLE 13

By reacting 8 - cyclohexylethyl-2-cyclopropylcarbonyl-5,5-dimethyl-10-hydroxy - 1,2,3,4 - tetrahydro - 5H-[1]benzopyrano[3,4-d]pyridine with equimolar amounts of γ-dimethylaminobutyric acid hydrochloride and dicyclohexylcarbodiimide, according to the method of Example 1, there is obtained 8-cyclohexylethyl-2-cyclopropylcarbonyl-5,5-dimethyl - 10-[4 - (dimethylamino)butyryloxy]-1,2,3,4-tetrahydro-5H-[1]benzopyrano[3,4-d]pyridine hydrochloride.

EXAMPLE 14

By reacting 2-[1-(cis-3 - chloro - 2 - propenyl]-5,5-dimethyl-10-hydroxy-8-(3-methyl-2-octyl) - 1,2,3,4 - tetrahydro-5H-[1]benzopyrano[3,4-d]pyridine with γ-diethylaminobutyric acid oleate and dicyclohexylcarbodiimide, according to the method of Example 1, there is obtained 2-[1-(cis-3-chloro-2-propenyl)] - 10 - [4-(diethylamino)butyryloxy]-5,5-dimethyl-8-(3-methyl - 2 - octyl)-1,2,3,4-tetrahydro-5H-[1]benzopyrano[3,4-d]pyridine oleate.

EXAMPLE 15

By reacting 5,5-dimethyl-8-(2 - heptyl)-10-hydroxy-2-[2-(4-methylphenethyl)] - 1,2,3,4 - tetrahydro - 5H-[1]benzopyrano[3,4-d]pyridine with equimolar amounts of β-diethylaminopropionic acid hydrochloride and dicyclohexylcarbodiimide, according to the method of Example 1, there is obtained 10-[3-(diethylamino)propionyloxy]-5,5-dimethyl-8-(2-heptyl) - 2 - [2-(4-methylphenethyl)]-1,2,3,4-tetrahydro - 5H - [1]benzopyrano[3,4-d]pyridine hydrochloride.

EXAMPLE 16

By reacting 5,5-dimethyl-10-hydroxy - 2 - (3-methyl-2-octyl)-1,2,3,4-tetrahydro - 5H - [1]benzopyrano[3,4-d]-pyridine with equimolar amounts of γ - diethylaminobutyric acid tosylate and dicyclohexylcarbodiimide, according to the method of Example 1, there is obtained 10-[4-(diethylamino)-butyryloxy]-5,5-dimethyl - 2 - (3-methyl - 2 - butenyl) - 8 - (3 - methyl - 2 - octyl)-1,2,3,4-tetrahydro-5H-[1]benzopyrano[3,4-d]pyridine tosylate.

EXAMPLE 17

By reacting 5,5-dimethyl-10-hydroxy - 8 - (3-methyl-2-octyl)-2-{4-[1-(3-sulfamylphenyl) - 1 - butenyl]}-1,2,3,4-tetrahydro-5H-[1]benzopyrano[3,4-d]pyridine with equimolar amounts of β-diisopropylaminopropionic acid and dicyclohexylcarbodiimide, in accordance with the method of Example 1, there is obtained 5,5-dimethyl-10-[3-(diisopropylamino)propionyloxy] - 2 - {4 - [1 - (3 - sulfamylphenyl)-1-butenyl]} - 1,2,3,4 - tetrahydro-5H-[1]benzopyrano[3,4-d]pyridine.

EXAMPLE 18

By reacting 5,5 - dimethyl - 10 - hydroxy - 8 - (3-methyl - 2 - octyl) - 2 - {3-(4-acetylaminophenyl)-1-butenyl]} - 1,2,3,4 - tetrahydro - 5H - [1]benzopyrano-[3,4-d]pyridine with equimolar amounts of γ - diethylaminobutyric acid hydrochloride and dicyclohexylcorbodiimide according to the method of Example 1 there is obtained 10 - [4 - (diethylamino)butyryloxy] - 5-5 - dimethyl-8-(3-methyl-2-octyl)-2-{3 - [1 - (4 - acetylaminophenyl) - 1 - butenyl]} - 1,2,3,4 - tetrahydro - 5H-[1]-pyridine hydrochloride.

EXAMPLE 19

By reacting 10 - hydroxy - 8 - (3 - methyl - 2 - octyl)-5,5 - di - n - propyl - 2 - {4-[1-(3-trifluoromethylphenyl)-1 - butenyl]} - 1,2,3,4 - tetrahydro - 5H - [1]benzopyrano[3,4-d]pyridine with equimolar amounts of γ-diethylaminobutyric acid sulfate and dicyclohexylcarbodiimide, according to the method of Example 1, there is obtained 10 - [4 - (diethylamino)butyryloxy] - 8 - (3 - methyl - 2 - octyl) - 5,5 - di-n-propyl - 2 - {4-[1-(3-trifluoromethylphenyl) - 1 - butenyl]} - 1,2,3,4 - tetrahydro-5H - [1]benzopyrano[3,4-d]pyridine sulfate.

EXAMPLE 20

By reacting 8 - cyclopropyl - 5,5 - dimethyl - 10 - hydroxy - 2 - propionyl - 1,2,3,4 - tetrahydro-5H-[1]benzopyrano[3,4-d]pyridine with equimolar amounts of γ-diethylaminobutyric acid citrate and dicyclohexylcarbodiimide, according to the method of Example 1, there is obtained 8 - cyclopropyl - 10 - [4 - (diethylamino)-butyryloxy] - 5,5 - dimethyl - 2 - propionyl - 1,2,3,4-tetrahydro - 5H - [1]benzopyrano[3,4-d]pyridine citrate.

EXAMPLE 21

By reacting 2 - cinnamyl - 8 - cyclopropylmethyl-5,5-dimethyl - 10 - hydroxy - 1,2,3,4 - tetrahydro - 5H - [1]-benzopyrano[3,4-d]pyridine with equimolar amounts of γ - diethylaminobutyric acid succinate and dicyclohexylcarbodiimide, according to the method of Example 1, there is obtained 2 - cinnamyl - 8 - cyclopropylmethyl-10 - [4 - (diethylamino)butyryloxy] - 5,5 - dimethyl-1,2,3,4 - tetrahydro - 5H - [1]benzopyrano[3,4-d]pyridine succinate.

EXAMPLE 22

By reacting 5,5 - dimethyl - 10 - hydroxy - 2 - [2 - (4-methylmercaptophenethyl)] - 8 - (3 - methyl - 2 - octyl)-1,2,3,4 - tetrahydro-5H - [1]benzopyrano-[3,4-d]pyridine with γ - diethylaminobutyric acid lactate and dicyclohexylcarbodiimide, according to the method of Example 1, there is obtained 10 - [4 - (diethylamino)butyryloxy]-5,5-dimethyl - 8 - (3 - methyl - 2 - octyl)-2-[2-(4-methylmercaptophenethyl)] - 1,2,3,4 - tetrahydro - 5H - [1]-benzopyrano - [3,4-d]pyridine lactate.

EXAMPLE 23

By reacting 5,5-dimethyl-10-hydroxy-8-(3-methyl-2-octyl) - 2 - [4 - (4-nitrophenylbutyl)]-1,2,3,4-tetrahydro-5H - [1]benzopyrano[3,4 - d]pyridine with equimolar amounts of γ-diethylaminobutyric acid hydrochloride and dicyclohexylcarbodiimide, according to the method of Example 1, there is obtained 10-[4-(diethylamino)butyryloxy]-5,5-dimethyl - 8 - (3 - methyl-2-octyl)-2-[4-(4-nitrophenylbutyl] - 1,2,3,4 - tetrahydro - 5H - [1]benzopyrano [3,4-d]pyridine hydrochloride.

EXAMPLE 24

By reacting 5,5-di-(1-hexyl)-10-hydroxy-8-methyl-2-[3-(1 - propynyl)] - 1,2,3,4 - tetrahydro - 5H - [1]benzopyrano[3,4-d]pyridine with equimolar amounts of γ-diethylaminobutyric acid hydrochloride and dicyclohexylcarbodiimide, according to the method of Example 1, there is obtained 10-[4-(diethylamino)butyryloxy]-5,5-di-(1-hexyl) - 8 - methyl - 2 - [3-(1-propynyl)]-1,2,3,4-tetrahydro-5H-[1]benzopyrano[3,4-d]pyridine hydrochloride.

The present invention includes within its scope pharmaceutical compositions comprising, as an active ingredient, at least one of the compounds of this invention in association with a pharmaceutical carrier or diluent. The compounds of this invention exhibit both oral and parenteral activity and can be formulated in dosage forms for oral, parenteral, or rectal administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include pharmaceutically acceptable emulsions, solutions, suspensions, syrups and elixirs containing inert diluents commonly used in the art, such as water. Besides inert diluents, such compositions can also include adjuvants, such as wetting agents, emulsifying and suspending agents and sweetening, flavoring and perfuming agents.

Preparations according to this invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration and on the duration of the treatment. Generally, oral dosage levels of between 0.5 and 250 mg./kg. of body weight daily are administered to patients suffering from depression. Preferred dosages are oral dosages of from 5 to 25 mg./kg.

The following example further illustrates the pharmaceutical compositions which are a feature of this invention:

EXAMPLE 25

Tablets weighing 500 mg. and having the following compositions are prepared by standard tableting procedures:

| Ingredient: | Mg. |
|---|---|
| 5,5 - dimethyl - 10 - [4 - (diethylamino)butyryloxy]-8 - (3 - methyl - 2 - octyl)-2-(2-propynyl)-1,2,3,4-tetrahydro - 5H - [1]benzopyrano[3,4 - d]pyridine hydrochloride | 250 |
| Starch | 190 |
| Colloidal silica | 50 |
| Magnesium stearate | 10 |

We claim:
1. A compound of the formula

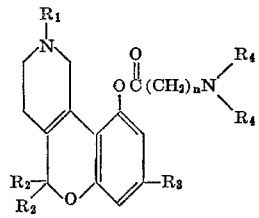

wherein $R_1$ is hydrogen, loweralkyl, cycloalkyloweralkyl, loweralkenyl $C_2$–$C_6$, loweralkynyl $C_2$–$C_6$, phenylloweralkyl having 1 to 4 carbon atoms in the alkyl portion, phenylloweralkenyl or phenylloweralkynyl having 2 to 4 carbon atoms in the alkenyl or alkynyl portion; $R_2$ is loweralkyl; $R_3$ is $C_1$–$C_{20}$ alkyl or cycloalkylloweralkyl; $n$ is an integer from 1 to 6; $R_4$ is hydrogen or loweralkyl; or a pharmaceutically acceptable acid addition salt thereof.

2. A compound in accordance with claim 1 wherein $R_1$ is loweralkenyl, or loweralkynyl and $R_2$, $R_3$ and $R_4$ are as defined in claim 1.

3. A compound of the formula

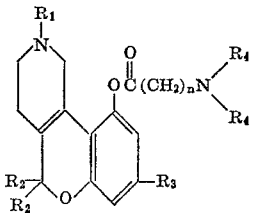

wherein $R_1$ is loweralkynyl; $R_2$ is loweralkyl; $R_3$ is $C_1$–$C_{20}$ alkyl or cycloalkylloweralkyl; $n$ is an integer from 1 to 6; $R_4$ is hydrogen or loweralkyl; or a pharamceutically acceptable acid addition salt thereof.

4. A compound in accordance with claim 3 wherein $R_1$ is propynyl.

5. A compound in accordance with claim 4: 5,5-dimethyl - 10 - [4-(diethylamino)butyryloxy]-8-(3-methyl-2-octyl) - 2 - (2 - propynyl) - 1,2,3,4 - tetrahydro-5H-[1]benzopyrano[3,4-d]pyridine or a pharmaceutically acceptable acid solution salt thereof.

6. A compound in accordance with claim 5: 5,5-dimethyl - 10 - [4-(diethylamino)butyryloxy]-8-(3-methyl-2-octyl) - 2 - (2 - propynyl) - 1,2,3,4 - tetrahydro-5H-[1]benzopyrano[3,4-d]pyridine hydrochloride.

References Cited
UNITED STATES PATENTS
3,429,889   2/1969   Shulgin _____ 260—295 T ALAN L. ROTMAN, Primary Examiner U.S. Cl. X.R.

260—240 D, 240 J, 240 TC; 424—266

UNITED STATES PATENT OFFICE
CERTIFICATE OF CORRECTION

Patent No. 3,787,424　　　　　　Dated January 22, 1974

Inventor(s) Harry George Pars and Raj Kumar Razdan

It is certified that error appears in the above-identified patent and that said Letters Patent are hereby corrected as shown below:

Column 2, line 31, "pyropylene" should be -- propylene --;

line 59, "dimide" should be -- diimide --;

Column 4, line 35, after "pyridine" a comma (,) should be inserted;

line 44, "dissobutylamino" should be -- diisobutylamino --;

line 59, "reaction" should be -- reacting --;

Column 5, line 47, after "3-methyl-2-" insert -- butenyl)-8-(3-methyl-2- --;

line 69, change "3-(4-" to -- 3-[1-(4- -- line 72, change "dicyclohexylcorbo" to -- dicyclohexylcarbo --;

Column 6, line 1, after "5H-[1]-" insert -- benzopyrano [3,4-d] --;

Column 8, line 39, change "pharamceutically" to -- pharmaceutically --.

Signed and sealed this 25th day of June 1974.

(SEAL)
Attest:

EDWARD M. FLETCHER, JR.　　　　　　　C. MARSHALL DANN
Attesting Officer　　　　　　　　　　Commissioner of Patents